(12) United States Patent
Yamamoto et al.

(10) Patent No.: US 11,077,794 B2
(45) Date of Patent: Aug. 3, 2021

(54) VEHICLE PERIPHERY DISPLAY DEVICE

(71) Applicant: AISIN SEIKI KABUSHIKI KAISHA, Kariya (JP)

(72) Inventors: Kinji Yamamoto, Kariya (JP); Kazuya Watanabe, Kariya (JP)

(73) Assignee: AISIN SEIKI KABUSHIKI KAISHA, Kariya (JP)

(*) Notice: Subject to any disclaimer, the term of this patent is extended or adjusted under 35 U.S.C. 154(b) by 0 days.

(21) Appl. No.: 16/929,454

(22) Filed: Jul. 15, 2020

(65) Prior Publication Data

US 2021/0016711 A1 Jan. 21, 2021

(30) Foreign Application Priority Data

Jul. 16, 2019 (JP) .............................. JP2019-131405

(51) Int. Cl.
  *B60R 1/00* (2006.01)
  *B62D 15/02* (2006.01)

(52) U.S. Cl.
  CPC ............ *B60R 1/002* (2013.01); *B62D 15/029* (2013.01); *B60R 2300/10* (2013.01); *B60R 2300/302* (2013.01); *B60R 2300/70* (2013.01)

(58) Field of Classification Search
  CPC . B60R 1/002; B60R 2300/70; B60R 2300/10; B60R 2300/302; B62D 15/029
  See application file for complete search history.

(56) References Cited

U.S. PATENT DOCUMENTS

2016/0088260 A1* 3/2016 Fujio ..................... H04N 7/181
                                                            348/148

FOREIGN PATENT DOCUMENTS

| JP | 3807330 B2 | 8/2006 |
| JP | 3894322 B2 | 3/2007 |
| JP | 5182137 B2 | 4/2013 |
| JP | 5605606 B2 | 10/2014 |

* cited by examiner

*Primary Examiner* — James M Pontius
(74) *Attorney, Agent, or Firm* — Sughrue Mion, PLLC (57) ABSTRACT

A vehicle periphery display device includes: an acquisition portion acquiring a captured image obtained by imaging a periphery of a vehicle with an imaging portion; and a display processing portion causing a display image including a vehicle image and a periphery image of the vehicle to be displayed on a display portion on the basis of the captured image. The display processing portion causes at least one of a contour guide line representing a contour of the vehicle image and having a first margin in a vehicle width direction of the vehicle image and a second margin in an advancing direction of the vehicle image, and a predicted course guide line that is a trajectory drawn by the contour guide line according to movement of the vehicle to be displayed in the display image, and changes at least one of the first and second margins when the vehicle is turned.

8 Claims, 9 Drawing Sheets

[STRAIGHT ADVANCING]   [TURNING TO LEFT]   [TURNING TO RIGHT]

FIG.12

[STRAIGHT ADVANCING] [TURNING]

VEHICLE PERIPHERY DISPLAY DEVICE

CROSS REFERENCE TO RELATED APPLICATIONS

This application is based on and claims priority under 35 U.S.C. § 119 to Japanese Patent Application 2019-131405, filed on Jul. 16, 2019, the entire content of which is incorporated herein by reference.

TECHNICAL FIELD

Embodiments of this disclosure relate to a vehicle periphery display device.

BACKGROUND DISCUSSION

A technique has been developed in which, when a display image including a vehicle image of a vehicle and a periphery image of the vehicle is displayed on a display portion, the display image includes a contour guide line representing a contour of the vehicle image, and a predicted course guide line that is a trajectory drawn by an end of the contour guide line according to movement of the vehicle.

However, in the technique, since the contour guide line is displayed at a fixed position with respect to a vehicle image, in a case where a position of the contour guide line or the predicted course guide line is not a position suitable for a vehicle handling situation (for example, in a case where the contour guide line includes a margin), the vehicle may pass through a position excessively separated from an object present therearound when the vehicle is turned.

A need thus exists for a vehicle periphery display device which is not susceptible to the drawback mentioned above.

SUMMARY

A vehicle periphery display device according to an embodiment includes, as an example, an acquisition portion that acquires a captured image obtained by imaging a periphery of a vehicle with an imaging portion; and a display processing portion that causes a display image including a vehicle image of the vehicle and a periphery image of the vehicle to be displayed on a display portion on the basis of the captured image acquired by the acquisition portion, in which the display processing portion causes at least one of a contour guide line representing a contour of the vehicle image and having a first margin in a vehicle width direction of the vehicle image and a second margin in an advancing direction of the vehicle image, and a predicted course guide line that is a trajectory drawn by the contour guide line according to movement of the vehicle to be displayed in the display image, and changes at least one of the first margin and the second margin in a case where the vehicle is turned.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, exemplary embodiments disclosed here will be described. The configurations of the embodiments described below and the operations, results, and effects provided by the configurations are examples. The present disclosure can be realized by configurations other than those disclosed in the following embodiments, and can achieve at least one of various effects based on the fundamental configuration and derivative effects.

First Embodiment

Figure 1:
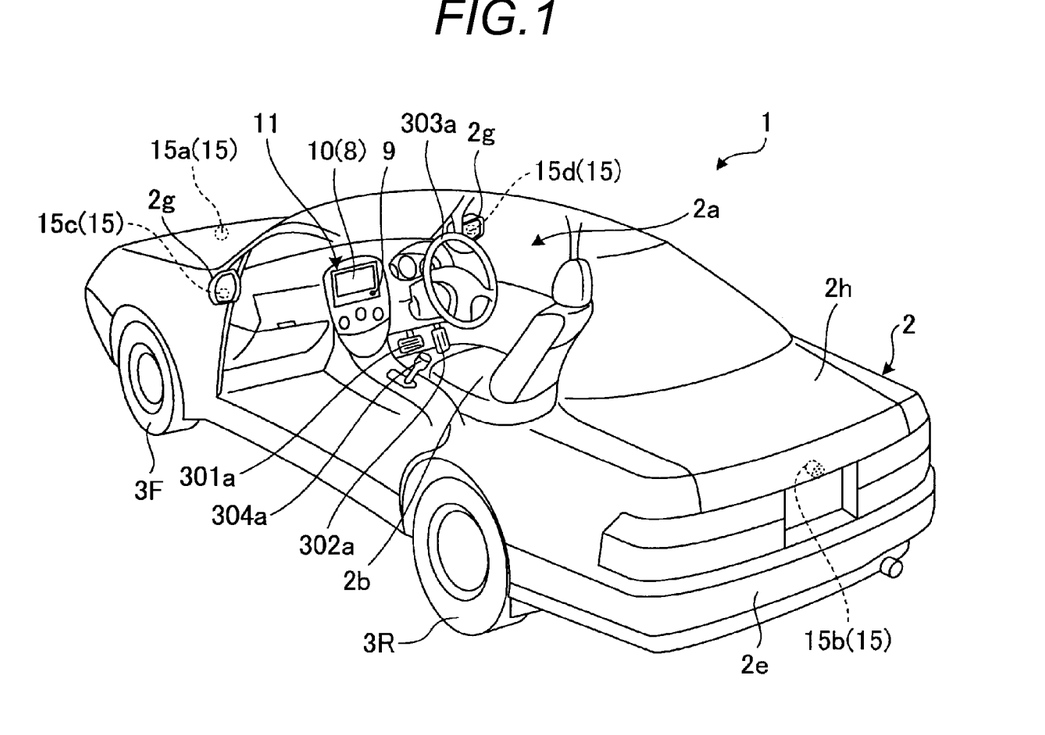
FIG. 1 is an exemplary and schematic diagram illustrating a configuration of a vehicle cabin of a vehicle according to a first embodiment.
Figure 2:
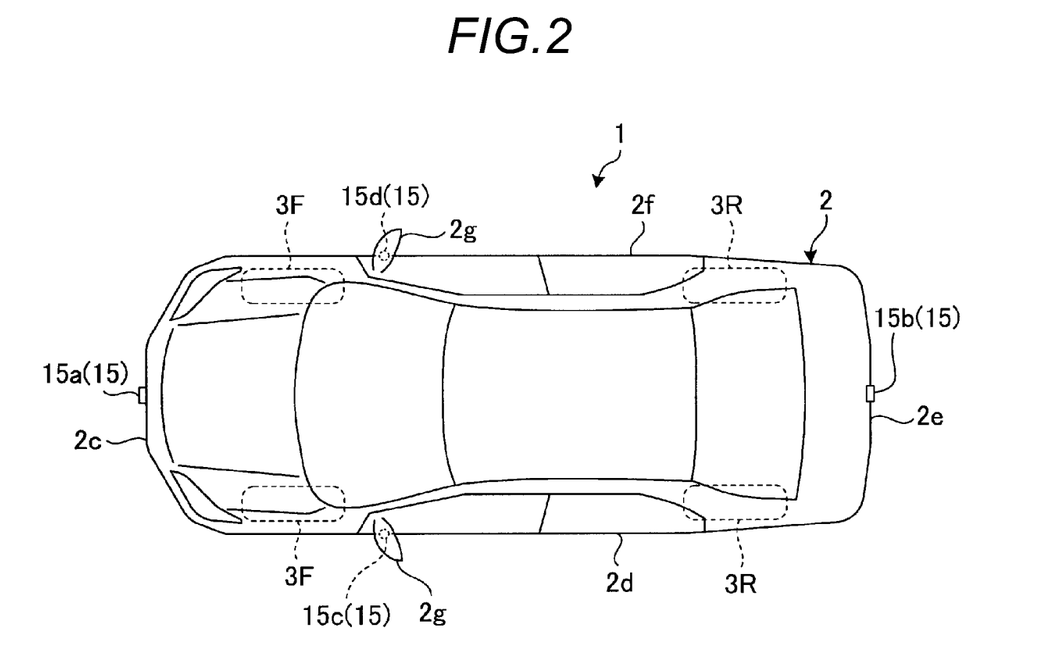
FIG. 2 is an exemplary and schematic view illustrating an appearance of the vehicle according to the first embodiment, viewed from above.

FIG. 1 is an exemplary and schematic diagram illustrating a configuration of a vehicle cabin of a vehicle according to a first embodiment. FIG. 2 is an exemplary and schematic view illustrating an appearance of the vehicle according to the first embodiment, viewed from above.

First, an example of a hardware configuration of a vehicle to which a vehicle periphery display device according to the present embodiment is applied will be described with reference to FIGS. 1 and 2.

As illustrated in FIG. 1, a vehicle 1 according to the present embodiment has a vehicle cabin 2a in which occupants including a driver as a user gets. In the vehicle cabin 2a, a braking portion (braking operation portion) 301a, an acceleration portion (acceleration operation portion) 302a, a steering portion 303a, a shift portion (shift operation portion) 304a, and the like are provided to be operable by the user from a seat 2b.

The braking portion 301a is, for example, a brake pedal provided under the driver's foot. The acceleration portion 302a is, for example, an accelerator pedal provided under the driver's foot. The steering portion 303a is, for example, a steering wheel protruding from a dashboard (instrument panel). The steering portion 303a may be a handle. The shift portion 304a is, for example, a shift lever protruding from the center console.

A monitor device 11 having a display portion 8 capable of outputting various images and a sound output portion 9 capable of outputting various sounds is provided in the vehicle cabin 2a. The monitor device 11 is provided, for example, in the central portion in the width direction (left-right direction) of the dashboard in the vehicle cabin 2a. The display portion 8 is, for example, a liquid crystal display (LCD) or an organic electroluminescence display (OELD).

An operation input portion 10 is provided on a display screen as a region in which an image is displayed on the display portion 8. The operation input portion 10 is, for example, a touch panel capable of detecting coordinates of a position where a pointer such as a finger or a stylus approaches (including contact). Consequently, the user (driver) can visually recognize an image displayed on the display screen of the display portion 8 and perform a touch (tap) operation or the like using the indicator on the operation input portion 10, to execute various operation inputs.

In the present embodiment, the operation input portion 10 may be various physical interfaces such as switches, dials, joysticks, and push buttons. In the present embodiment, another sound output device may be provided at a position different from the position of the monitor device 11 in the vehicle cabin 2a. In this case, various pieces of sound information may be output from both of the sound output portion 9 and another sound output device. In the present embodiment, the monitor device 11 may be configured to be able to display information regarding various systems such as a navigation system and an audio system.

As illustrated in FIGS. 1 and 2, the vehicle 1 according to the present embodiment is configured with a four-wheeled vehicle having two front vehicle wheels 3F on the left and right and two rear vehicle wheels 3R on the left and right. Hereinafter, for simplification, the front vehicle wheels 3F and the rear vehicle wheels 3R may be collectively referred to as vehicle wheels. In the embodiment, sideslip angles of some or all of the four vehicle wheels are changed (turned) according to an operation on the steering portion 303a.

The vehicle 1 is equipped with a plurality of (four in the example illustrated in FIGS. 1 and 2) in-vehicle cameras 15a to 15d as imaging portions for monitoring the periphery. The in-vehicle camera 15a is provided at a rear end 2e of a vehicle body 2 (for example, below a rear trunk door 2h), and images a rearward region of the vehicle 1. The in-vehicle camera 15b is provided on a side-view mirror 2g at a right end 2f of the vehicle body 2, and images a rightward region of the vehicle 1. The in-vehicle camera 15c is provided at a front end 2c (for example, a front bumper) of the vehicle body 2, and images a frontward region of the vehicle 1. The in-vehicle camera 15d is provided on a side-view mirror 2g at a left end 2d of the vehicle body 2, and images a leftward region of the vehicle 1. Hereinafter, for simplification, the in-vehicle cameras 15a to 15d will be collectively referred to as the in-vehicle camera 15 in some cases.

The in-vehicle camera 15 is a so-called digital camera having an imaging element such as a charge coupled device (CCD) or a complementary metal oxide semiconductor (CMOS) image sensor. The in-vehicle camera 15 images the surroundings (periphery) of the vehicle 1 at a predetermined frame rate, and outputs image data of a captured image obtained through the imaging. The image data obtained by the in-vehicle camera 15 may form a moving image as a frame image.

Figure 3:
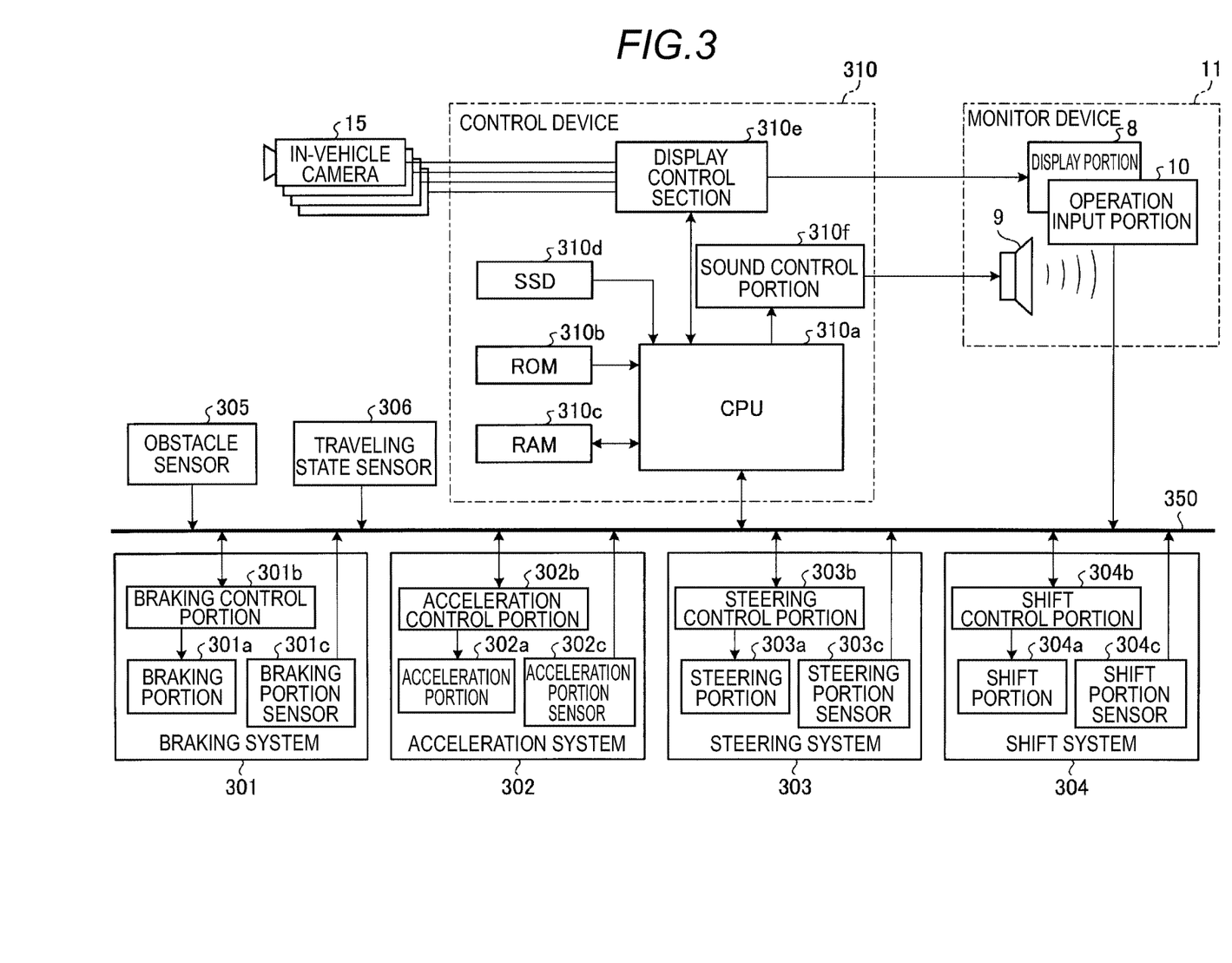
FIG. 3 is an exemplary and schematic block diagram illustrating a system configuration of the vehicle according to the first embodiment.

FIG. 3 is an exemplary and schematic block diagram illustrating the system configuration of the vehicle according to the first embodiment.

Next, with reference to FIG. 3, a system configuration provided for realizing various types of control in the vehicle 1 according to the embodiment will be described. The system configuration illustrated in FIG. 3 is only an example, and may be variously set (changed).

As illustrated in FIG. 3, the vehicle 1 according to the present embodiment includes a braking system 301, an acceleration system 302, a steering system 303, a shift system 304, an obstacle sensor 305, and a traveling state sensor 306, the in-vehicle camera 15, the monitor device 11, a control device 310, and an in-vehicle network 350.

The braking system 301 controls deceleration of the vehicle 1. The braking system 301 includes the braking portion 301a, a braking control portion 301b, and a braking portion sensor 301c.

The braking portion 301a is a device for decelerating the vehicle 1, such as the above-described brake pedal.

The braking control portion 301b is, for example, a microcomputer having a hardware processor such as a central processing unit (CPU). The braking control portion 301b controls, for example, the extent of deceleration of the vehicle 1 by driving an actuator (not illustrated) and operating the braking portion 301a on the basis of an instruction that is input via the in-vehicle network 350.

The braking portion sensor 301c is a sensing device that detects a state of the braking portion 301a. For example, in a case where the braking portion 301a is configured with a brake pedal, the braking portion sensor 301c detects a position of the brake pedal or the pressure acting on the brake pedal as a state of the braking portion 301a. The braking portion sensor 301c outputs the detected state of the braking portion 301a to the in-vehicle network 350.

The acceleration system 302 controls acceleration of the vehicle 1. The acceleration system 302 has the acceleration portion 302a, an acceleration control portion 302b, and an acceleration portion sensor 302c.

The acceleration portion 302a is a device for accelerating the vehicle 1, such as the accelerator pedal described above.

The acceleration control portion 302b is configured with, for example, a microcomputer having a hardware processor such as a CPU. The acceleration control portion 302b controls, for example, the extent of acceleration of the vehicle 1 by driving an actuator (not illustrated) and operating the acceleration portion 302a on the basis of an instruction that is input via the in-vehicle network 350.

The acceleration portion sensor 302c is a sensing device that detects a state of the acceleration portion 302a. For example, in a case where the acceleration portion 302a is configured with an accelerator pedal, the acceleration portion sensor 302c detects a position of the accelerator pedal or the pressure acting on the accelerator pedal. The acceleration portion sensor 302c outputs the detected state of the acceleration portion 302a to the in-vehicle network 350.

The steering system 303 controls an advancing direction of the vehicle 1. The steering system 303 includes the steering portion 303a, a steering control portion 303b, and a steering portion sensor 303c.

The steering portion 303a is a device that turns the turning wheels of the vehicle 1, such as the above-described steering wheel or handle.

The steering control portion 303b is configured with, for example, a microcomputer having a hardware processor such as a CPU. The steering control portion 303b controls, for example, an advancing direction of the vehicle 1 by driving an actuator (not illustrated) and operating the steering portion 303a on the basis of an instruction that is input via the in-vehicle network 350.

The steering portion sensor 303c is a sensing device that detects a state of the steering portion 303a, that is, a steering angle sensor that detects a steering angle of the steering portion 303a. For example, in a case where the steering portion 303a is configured with a steering wheel, the steering portion sensor 303c detects a position of the steering wheel or a rotation angle of the steering wheel. In a case where the steering portion 303a is configured with a handle, the steering portion sensor 303c may detect a position of the handle or the pressure acting on the handle. The steering portion sensor 303c outputs the detected state of the steering portion 303a to the in-vehicle network 350.

The shift system 304 controls a gear ratio of the vehicle 1. The shift system 304 includes the shift portion 304a, a shift control portion 304b, and a shift portion sensor 304c.

The shift portion 304a is a device that changes a gear ratio of the vehicle 1, such as the shift lever described above.

The shift control portion 304b is configured with a computer having a hardware processor such as a CPU. The shift control portion 304b controls, for example, a gear ratio of the vehicle 1 by driving an actuator (not illustrated) operating the shift portion 304a on the basis of an instruction that is input via the in-vehicle network 350.

The shift portion sensor 304c is a sensing device that detects a state of the shift portion 304a. For example, in a case where the shift portion 304a is configured with a shift lever, the shift portion sensor 304c detects a position of the shift lever or the pressure acting on the shift lever. The shift portion sensor 304c outputs the detected state of the shift portion 304a to the in-vehicle network 350.

The obstacle sensor 305 is a detection portion that detects information regarding an object (obstacle) that may be present around the vehicle 1. The obstacle sensor 305 includes, for example, a range finding sensor that acquires a distance to an object present around the vehicle 1. The range finding sensor may employ, for example, a sonar that transmits a sound wave and obtains a distance by receiving a sound wave reflected by an object present around the vehicle 1, or a laser radar that transmits a radio wave such as light and acquires a distance by receiving a radio wave reflected by an object present around the vehicle 1. The obstacle sensor 305 outputs the detected information to the in-vehicle network 350.

The traveling state sensor 306 is a device that detects a traveling state of the vehicle 1. The traveling state sensor 306 is, for example, a vehicle wheel sensor that detects a vehicle wheel speed of the vehicle 1, an acceleration sensor that detects an acceleration of the vehicle 1 in a front-rear direction or a leftward-rightward direction, or a gyro sensor that detects a turning speed (angular speed) of the vehicle 1. The traveling state sensor 306 outputs the detected traveling state to the in-vehicle network 350.

The control device 310 is a device that integrally controls various systems provided in the vehicle 1. As details will be described later, the control device 310 according to the embodiment has a function of generating a display image including a vehicle image of the vehicle 1 and a periphery image of the vehicle 1 on the basis of image data as a result of imaging in the in-vehicle camera 15, and displaying the generated display image on the display portion 8.

Here, the display image includes, for example, a bird's-eye view image in which situations of the vehicle 1 and the periphery thereof are viewed from above, a three-dimensional image in which situations of the vehicle 1 and the periphery thereof are three-dimensionally viewed from any viewpoint, and a single-camera image that is an image based on only one piece of image data acquired from a single in-vehicle camera 15.

The control device 310 is configured with an electronic control unit (ECU) including a central processing unit (CPU) 310a, a read only memory (ROM) 310b, a random access memory (RAM) 310c, a solid state drive (SSD) 310d, a display control section 310e, and a sound control portion 310f.

The CPU 310a is a hardware processor that integrally controls the control device 310. The CPU 310a reads various control programs (computer programs) stored in the ROM 310b or the like, and realizes various functions according to instructions defined in the various control programs. Here, the various control programs include a display control program for realizing the display control process for displaying a display image as described above.

The ROM 310b is a nonvolatile main storage device that stores parameters and the like necessary for executing the above-described various control programs.

The RAM 310c is a volatile main storage device that provides a work area for the CPU 310a.

The SSD 310d is a rewritable nonvolatile auxiliary storage device. In the control device 310 according to the embodiment, a hard disk drive (HDD) may be provided as an auxiliary storage device instead of the SSD 310d (or in addition to the SSD 310d).

The display control section 310e mainly performs image processing on a captured image obtained from the in-vehicle camera 15 or generates image data to be output to the display portion 8 of the monitor device 11 among various processes that can be executed by the control device 310.

The sound control portion 310f mainly generates sound data to be output to the sound output portion 9 of the monitor device 11 among the various processes that can be executed by the control device 310.

The in-vehicle network 350 communicably connects the braking system 301, the acceleration system 302, the steering system 303, the shift system 304, the obstacle sensor 305, the traveling state sensor 306, the operation input portion 10 of the monitor device 11, and the control device 310 to each other.

Meanwhile, various techniques for notifying an occupant of situations of the vehicle 1 and the periphery thereof by using the above-described display image have been examined. For example, there has been examined a technique in which a contour guide line that represents a contour (shape) of a vehicle image of the vehicle 1 and a predicted course guide line that is a trajectory drawn by the contour guide line according to movement of the vehicle 1 are included in a display image. According to this technique, it is possible to notify an occupant of a positional relationship between the vehicle 1 and an object present around the vehicle 1 in a more understandable manner.

However, in the above technique, the contour guide line is displayed in the display image at a position fixed with respect to the position of the vehicle image. Therefore, in a case where a margin is provided between the vehicle image and the contour guide line, when the vehicle 1 is turned, the vehicle 1 may travel at a position at which the vehicle 1 is excessively separated from an object present around the vehicle and through which the vehicle passes.

Figure 4:
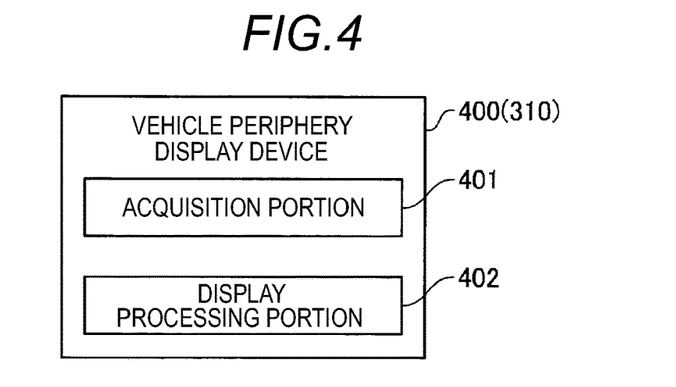
FIG. 4 is an exemplary and schematic block diagram of a functional configuration of a vehicle periphery display device of the vehicle according to the first embodiment.

Therefore, in the embodiment, by implementing a vehicle periphery display device 400 having the following function illustrated in FIG. 4 in the control device 310, in a case where the vehicle 1 is turned, it is achieved to prevent the vehicle 1 from passing through a position excessively separated from an object present therearound.

FIG. 4 is an exemplary and schematic block diagram of a functional configuration of the vehicle periphery display device of the vehicle according to the first embodiment.

Next, with reference to FIG. 4, a description will be made of an example of a functional configuration of the vehicle periphery display device 400 according to the present embodiment.

Functions illustrated in FIG. 4 are realized in the control device 310 by software and hardware in cooperation. That is, the functions illustrated in FIG. 4 are realized as a result of the CPU 310a of the control device 310 reading and executing a predetermined control program stored in the ROM 310b or the like.

In the present embodiment, the functions illustrated in FIG. 4 are realized by the software and hardware in cooperation, but are not limited thereto, and at least one of the functions illustrated in FIG. 4 may be realized by dedicated hardware (circuit).

The vehicle periphery display device 400 according to the present embodiment has an acquisition portion 401 and a display processing portion 402, as illustrated in FIG. 4.

The acquisition portion 401 acquires image data of a captured image from the in-vehicle camera 15. The acquisition portion 401 also acquires a steering angle detected by the steering portion sensor 303c. The acquisition portion 401 acquires an object detection result from the obstacle sensor 305.

The display processing portion 402 generates a display image including a vehicle image that is an image of the vehicle 1 and a periphery image that is an image of the periphery of the vehicle 1 on the basis of the captured image acquired by the acquisition portion 401. The display processing portion 402 displays the generated display image on the display portion 8.

In the present embodiment, the display processing portion 402 generates, as the display image, a bird's-eye view image that is an image in which the vehicle 1 and the periphery thereof are viewed from directly above the vehicle 1, and a stereoscopic image in which a three-dimensional space including the vehicle image of the vehicle 1 and the periphery image of the vehicle 1 is viewed from any viewpoint, or a single captured image (so-called single-camera image) acquired from the single in-vehicle camera 15.

The display processing portion 402 causes a contour guide line and a predicted course guide line to be displayed in the display image. Here, the contour guide line is a line representing a contour (shape) of the vehicle image, that is, a contour line of the vehicle 1. Specifically, the contour guide line is a line along the contour of the vehicle image in a vehicle width direction of the vehicle image and a direction parallel to an advancing direction of the vehicle image. The contour guide line has a margin in the vehicle width direction of the vehicle image (hereinafter, referred to as a vehicle width direction margin) and a margin in the advancing direction of the vehicle image (hereinafter, referred to as an advancing direction margin).

The predicted course guide line is a trajectory drawn by the contour guide line according to movement of the vehicle 1. In the present embodiment, the predicted course guide line is a trajectory drawn by an end (corner) of the contour guide line according to movement of the vehicle 1.

In the present embodiment, the display processing portion 402 causes both the contour guide line and the predicted course guide line to be displayed in the display image, but is not limited thereto as long as at least one of the contour guide line and the predicted course guide line is displayed in the display image.

In a case where the vehicle 1 is turned, the display processing portion 402 changes the vehicle width direction margin and the advancing direction margin. Consequently, when the vehicle 1 is turned, the contour guide line can be displayed at a position close to the contour of the vehicle image or the predicted course guide line can be displayed at a position close to a course through which the contour thereof passes in the display image. As a result, in a case where the contour guide line includes a margin, when the vehicle 1 is turned, it is possible to prevent the vehicle 1 from passing through a position excessively separated from an object present therearound.

In the present embodiment, in a case where the vehicle 1 is turned, the display processing portion 402 changes both the vehicle width direction margin and the advancing direction margin, but may change at least one of the vehicle width direction margin and the advancing direction margin.

Figure 5:
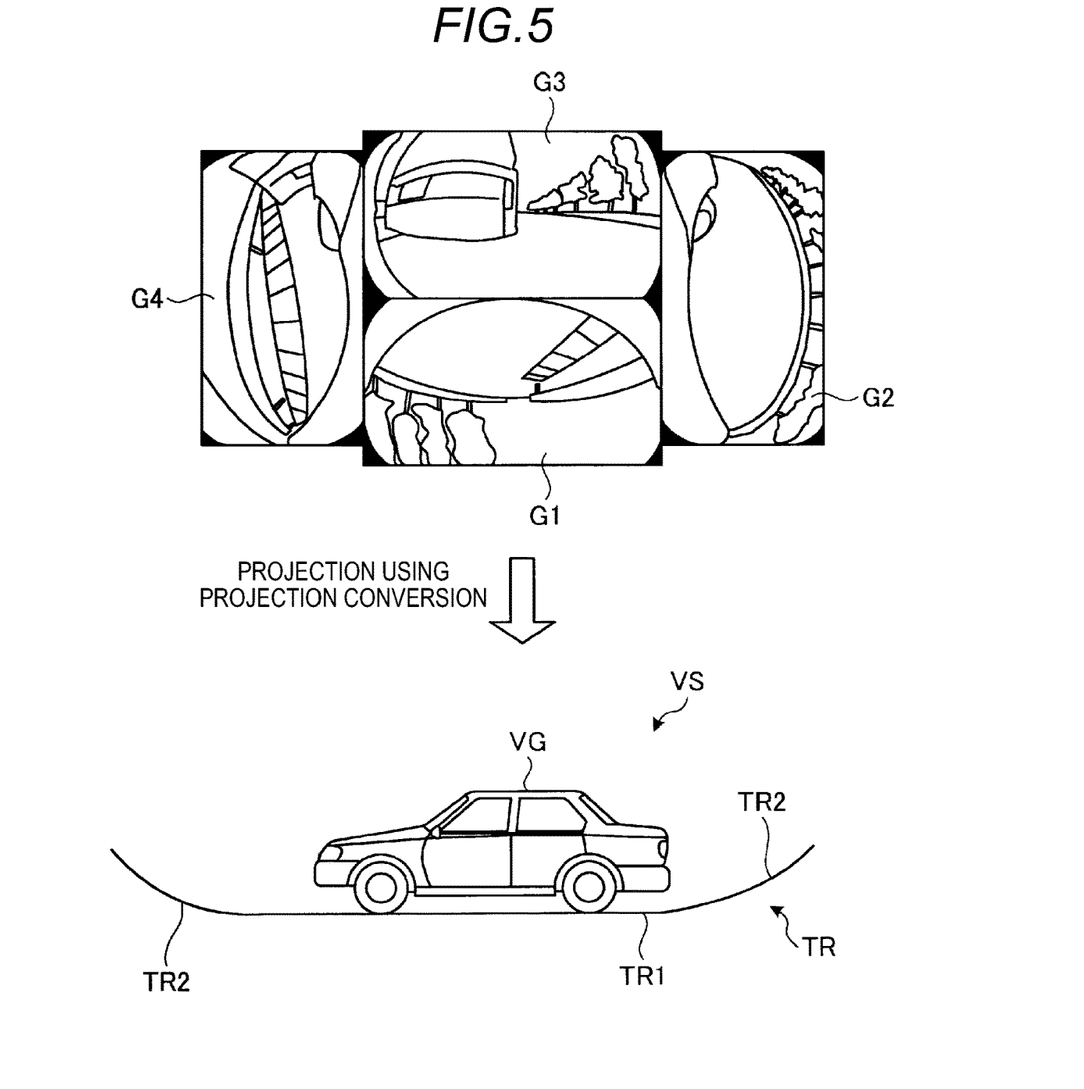
FIG. 5 is a diagram for describing an example of a display image generation process by the vehicle periphery display device of the vehicle according to the first embodiment.
Figure 6:
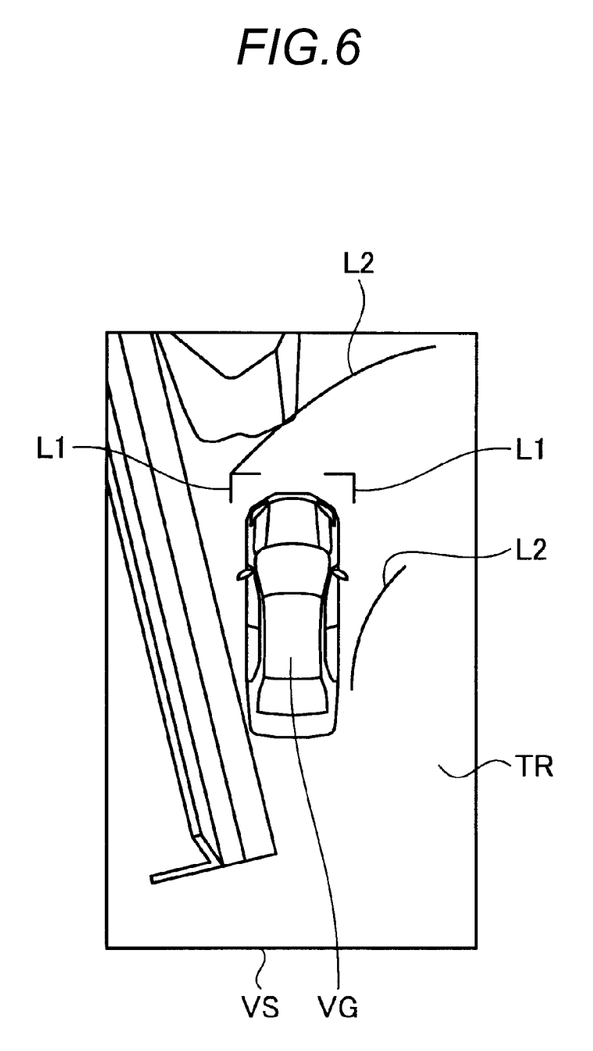
FIG. 6 is a diagram for describing an example of a process in which a display image is generated by the vehicle periphery display device of the vehicle according to the first embodiment.

FIGS. 5 and 6 are diagrams for describing an example of a process in which a display image is generated by the vehicle periphery display device of the vehicle according to the first embodiment.

Next, with reference to FIGS. 5 and 6, a description will be made of an example of a process in which a display image is generated by the vehicle periphery display device 400.

As illustrated in FIG. 5, the acquisition portion 401 acquires a captured image C1 obtained by imaging the rearward of the vehicle 1 with the in-vehicle camera 15a, a captured image G2 obtained by imaging the rightward of the vehicle 1 with the in-vehicle camera 15b, a captured image G3 obtained by imaging the frontward of the vehicle 1 with the in-vehicle camera 15c, and a captured image G4 obtained by imaging the leftward of the vehicle 1 with the in-vehicle camera 15d.

Next, the display processing portion 402 projects the captured images G1 to G4 onto a stereoscopic space VS (hereinafter, referred to as a three-dimensional space). Here, the three-dimensional space VS is a stereoscopic space including a vehicle image VG which is a stereoscopic image of the vehicle 1 and a projection region TR around the vehicle image VG. In the present embodiment, the projection region TR has a projection surface TR1 (hereinafter, referred to as a plane projection region) that is horizontal to the vehicle image VG and a stereoscopic projection region TR2 that is located around the plane projection region TR1.

The display processing portion 402 projects the captured images G1 to G4 onto the three-dimensional space VS. Specifically, the display processing portion 402 converts each coordinate in each of the captured images G1 to G4 into a coordinate in the three-dimensional space VS through projection conversion. Next, the display processing portion 402 projects an image at each coordinate in each of the captured images G1 to G4 to a position (projection region TR) represented by the coordinate subjected to the projection conversion from each coordinate in the three-dimensional space VS. Consequently, the display processing portion 402 projects the captured images G1 to G4 onto the three-dimensional space VS.

As illustrated in FIG. 6, the display processing portion 402 causes a contour guide line L1 and a predicted course guide line L2 to be included in the three-dimensional space VS. The display processing portion 402 generates an image in which the three-dimensional space VS is viewed from a predetermined viewpoint as a display image. Consequently, the display processing portion 402 causes the contour guide line L1 and the predicted course guide line L2 to be included in the display image. Here, the predetermined viewpoint is a preset viewpoint.

In the present embodiment, the display processing portion 402 may cause a line representing a part (for example, a corner) of a contour of the vehicle image VG to be included in the display image as the contour guide line L1, but is not limited thereto, and may cause a line representing the entire contour of the vehicle 1 to be included in the display image as the contour guide line L1.

Herein, an example is described in which the display processing portion 402 generates an image in which the three-dimensional space VS is viewed from a predetermined viewpoint as a display image, but may generate a bird's-eye view image, a single-camera image, or a three-dimensional restoration image of the vehicle 1 and the periphery thereof as a display image. In a case where a three-dimensional restoration image is generated as a display image, the display processing portion 402 three-dimensionally restores the vehicle 1 and the periphery thereof by using a captured image obtained through imaging in the in-vehicle camera 15 or a result of the obstacle sensor 305 (for example, a sonar or a radar) detecting an object around the vehicle 1, and causes an image represented by dots or lines on the display portion 8 to be displayed as a display image.

Figure 7:
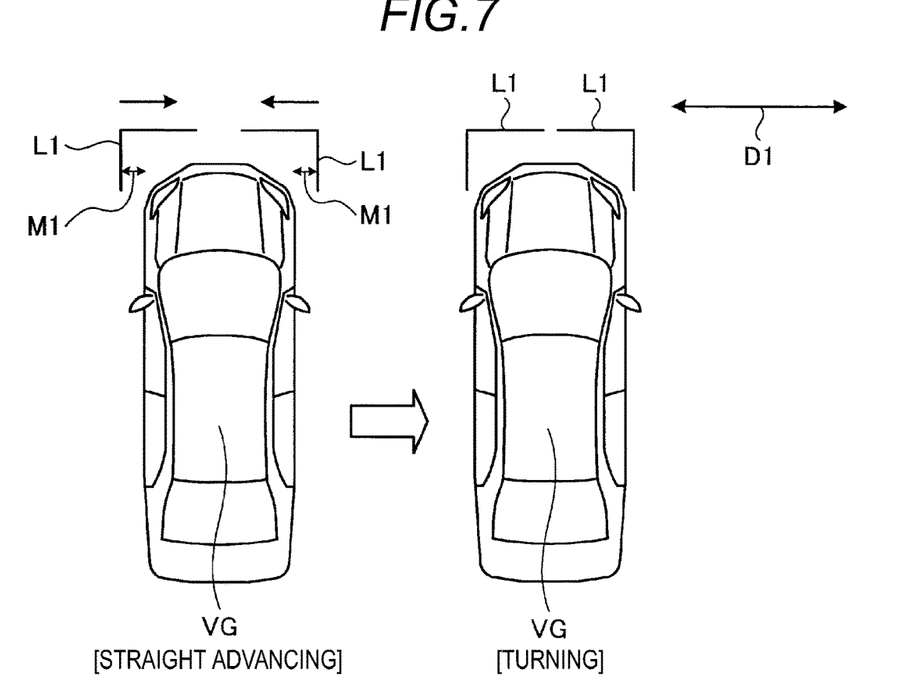
FIG. 7 is a diagram for describing an example of a process in which a margin of a contour guide line is changed by the vehicle periphery display device of the vehicle according to the first embodiment.
Figure 8:
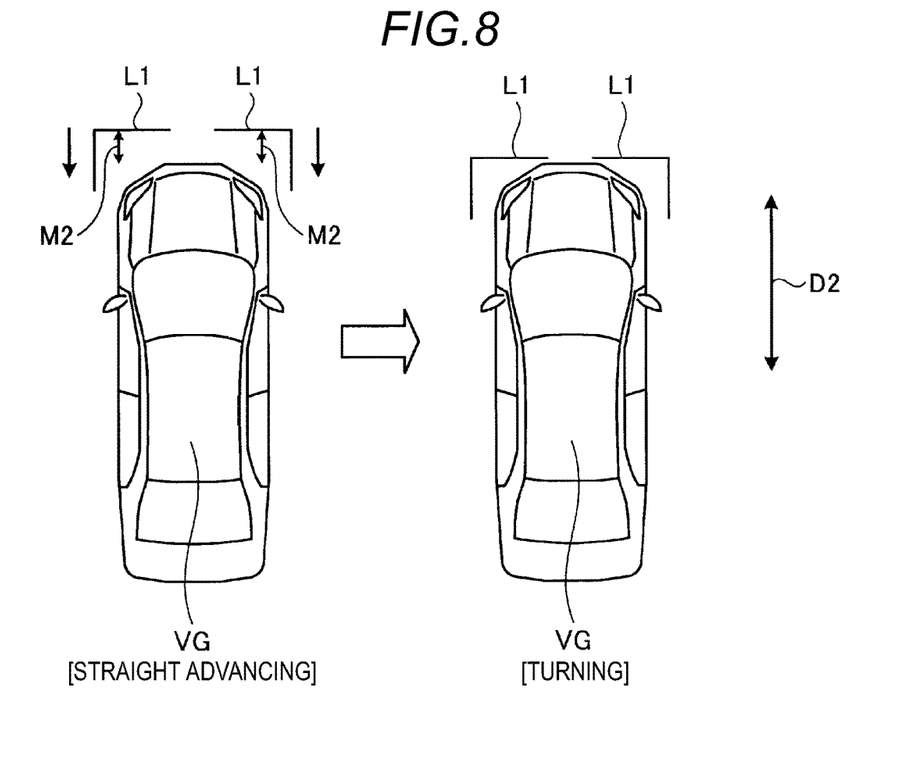
FIG. 8 is a diagram for describing an example of a process in which a margin of the contour guide line is changed by the vehicle periphery display device of the vehicle according to the first embodiment.

FIGS. 7 and 8 are diagrams for describing an example of a process in which a margin of a contour guide line is changed by the vehicle periphery display device of the vehicle according to the first embodiment.

Next, a description will be made of an example of a process in which a margin of the contour guide line L1 is changed by the vehicle periphery display device 400 with reference to FIGS. 7 and 8.

In a case where the vehicle 1 advances straight, as illustrated in FIG. 7, the display processing portion 402 causes the contour guide line L1 having a vehicle width direction margin M1 in a vehicle width direction D1 of the vehicle image VG based on a width of the side-view mirror of the vehicle image VG (for example, the vehicle width direction margin M1 equal to or more than the width of the side-view mirror of the vehicle image VG) to be included in a display image. In a case where the vehicle 1 advances straight, as illustrated in FIG. 8, the display processing portion 402 causes the contour guide line L1 having an advancing direction margin M2 based on a predetermined margin (for example, 30 cm in the real space) in an advancing direction D2 of the vehicle image VG to be included in a display image.

In a case where the vehicle 1 is turned, as illustrated in FIG. 7, the display processing portion 402 reduces the vehicle width direction margin M1 by the width of the side-view mirror of the vehicle image VG. Consequently, when the vehicle 1 is turned, the contour guide line L1 can be displayed at a position close to the contour of the vehicle image VG or the predicted course guide line L2 can be displayed at a position close to a course through which the contour of the vehicle image VG passes according to movement of the vehicle 1 in the display image. As a result, in a case where the contour guide line L1 includes the vehicle width direction margin M1, when the vehicle 1 is turned, it is possible to prevent the vehicle 1 from passing through a position excessively separated from an object present therearound.

In the present embodiment, in a case where the vehicle 1 is turned, the display processing portion 402 reduces the vehicle width direction margin M1 by the width of the side-view mirror of the vehicle image VG, but is not limited thereto as long as the vehicle width direction margin M1 is reduced in a case where the vehicle 1 is turned compared with a case where the vehicle 1 advances straight.

In the present embodiment, the display processing portion 402 reduces the vehicle width direction margin M1 in a case where a steering angle acquired by the acquisition portion 401 (hereinafter, referred to as a steering angle of the vehicle 1) is equal to or more than a predetermined steering angle. Here, the predetermined steering angle is a preset steering angle, and is a steering angle of the vehicle 1 from which the vehicle 1 is determined as being turned.

In this case, in a case where the steering angle of the vehicle 1 is equal to or more than the predetermined steering angle (in a case where the vehicle 1 is turned), the display processing portion 402 may gradually reduce the vehicle width direction margin M1 with the passage of time, or may reduce a speed at which the vehicle width direction margin M1 is reduced as the vehicle width direction margin M1 becomes smaller. Consequently, when the vehicle 1 is turned, it is possible to prevent an occupant of the vehicle 1 from feeling uncomfortable due to the vehicle width direction margin M1 abruptly becoming smaller. The display processing portion 402 may reduce the vehicle width direction margin M1 according to a change in a steering angle of the vehicle 1 regardless of whether the steering angle of the vehicle 1 is equal to or more than the predetermined steering angle.

In a case where the vehicle 1 is turned, the display processing portion 402 reduces the advancing direction margin M2 by a predetermined margin, as illustrated in FIG. 8. Consequently, when the vehicle 1 is turned, the contour guide line L1 can be displayed at a position close to the contour of the vehicle image VG or the predicted course guide line L2 can be displayed at a position close to a course through which the contour of the vehicle image VG passes according to movement of the vehicle 1 in the display image. As a result, in a case where the contour guide line L1 includes the advancing direction margin M2, when the vehicle 1 is turned, it is possible to prevent the vehicle 1 from passing through a position excessively separated from an object present therearound.

In the present embodiment, in a case where the vehicle 1 is turned, the display processing portion 402 reduces the advancing direction margin M2 by the predetermined margin, but is not limited thereto as long as the advancing direction margin M2 is reduced in a case where the vehicle 1 is turned compared with a case where the vehicle 1 advances straight.

In the present embodiment, the display processing portion 402 reduces the advancing direction margin M2 in a case where a steering angle acquired by the acquisition portion 401 is equal to or more than the predetermined steering angle. In this case, in a case where the steering angle of the vehicle 1 is equal to or more than the predetermined steering angle (in a case where the vehicle 1 is turned), the display processing portion 402 may gradually reduce the advancing direction margin M2 with the passage of time, or may reduce a speed at which the advancing direction margin M2 is reduced as the advancing direction margin M2 becomes smaller. Consequently, when the vehicle 1 is turned, it is possible to prevent an occupant of the vehicle 1 from feeling uncomfortable due to the advancing direction margin M2 abruptly becoming smaller. The display processing portion 402 may reduce the advancing direction margin M2 according to a change in a steering angle of the vehicle 1 regardless of whether the steering angle of the vehicle 1 is equal to or more than the predetermined steering angle.

Figure 9:
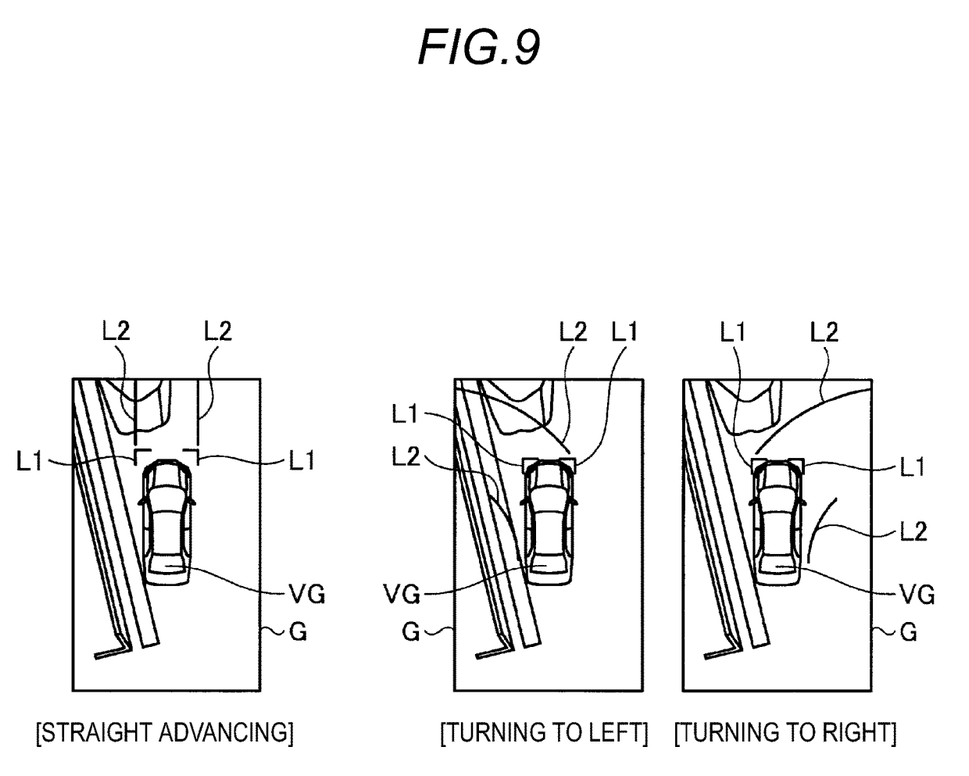
FIG. 9 is a diagram for describing an example of a process in which a predicted course guide line is displayed by the vehicle periphery display device of the vehicle according to the first embodiment.

FIG. 9 is a diagram for describing an example of a process in which a predicted course guide line is displayed by the vehicle periphery display device of the vehicle according to the first embodiment.

Next, with reference to FIG. 9, a description will be made of an example of a process in which the predicted course guide line L2 is displayed by the vehicle periphery display device 400.

In a case where the vehicle 1 advances straight, as illustrated in FIG. 9, the display processing portion 402 causes trajectories drawn by corners of the left and right contour guide lines L1 of the vehicle image VG according to movement of the vehicle 1 to be displayed in a display image G as the predicted course guide line L2.

In a case where the vehicle 1 is turned to the left, as illustrated in FIG. 9, the display processing portion 402 causes trajectories drawn by the corner of the right contour guide line L1 of the vehicle image VG and the image of the left rear vehicle wheel of the vehicle image VG according to movement of the vehicle 1 to be displayed in the display image G as the predicted course guide line L2.

In a case where the vehicle 1 is turned to the right, as illustrated in FIG. 9, the display processing portion 402 causes trajectories drawn by the corner of the left contour guide line L1 of the vehicle image VG and the image of the right rear vehicle wheel of the vehicle image VG according to movement of the vehicle 1 to be displayed in the display image G as the predicted course guide line L2.

In the present embodiment, as illustrated in FIG. 9, the display processing portion 402 also causes the trajectory drawn by the image of the vehicle wheel of the vehicle image VG on the turning direction side of the vehicle 1 according to movement of the vehicle 1 to be displayed in the display image G as the predicted course guide line L2, but may cause at least a trajectory drawn by the contour guide line L1 toward an opposite side to a turning direction of the vehicle 1 according to movement of the vehicle 1 to be displayed in the display image G as the predicted course guide line L2.

In the present embodiment, the display processing portion 402 causes only the contour guide line L1 and the predicted course guide line L2 whose margin (at least one of the vehicle width direction margin M1 illustrated in FIG. 7 and the advancing direction margin M2 illustrated in FIG. 8) of the contour guide line L1 has been changed to be displayed in the display image G, but may cause at least one of the contour guide line L1 and the predicted course guide line L2 whose margin of the contour guide line L1 has been changed, to remain displayed in the display image G. Consequently, it is possible to easily recognize that the margin of the contour guide line L1 has been changed, and thus to prompt an occupant to have to drive the vehicle 1 in accordance with the contour guide line L1 and the predicted course guide line L2 whose margin of the contour guide line L1 has been changed. As a result, the vehicle 1 can pass through an obstacle more safely.

In this case, the display processing portion 402 may make a display mode of at least one of the contour guide line L1 and the predicted course guide line L2 before being changed and a display mode of at least one of the changed contour guide line L1 and the predicted course guide line L2 different from each other. For example, the display processing portion 402 causes the pre-change contour guide line L1 and the predicted course guide line L2 to be displayed in gray, and causes the changed contour guide line L1 and the predicted course guide line L2 to be displayed in yellow. In other words, the display processing portion 402 makes colors of the contour guide line L1 and the predicted course guide line L2 before being changed different from colors of the contour guide line L1 and the predicted course guide line L2 after being changed.

Consequently, in a case where both the contour guide lines L1 and the predicted course guide lines L2 whose vehicle width direction margin and advancing direction margin has not been changed and has been changed are included in the display image, it is possible to easily determine whether to operate the vehicle 1 along which ones of the contour guide lines L1 and the predicted course guide lines L2. As a result, it is possible to further reduce a probability that an occupant who sees the display image may misunderstand a distance from the vehicle 1 to an obstacle and thus the vehicle 1 may collide with the obstacle.

In the present embodiment, in a case where the vehicle 1 is turned, the display processing portion 402 changes at least one of the vehicle width direction margin and the advancing direction margin and changes a position of at least one of the contour guide line L1 and the predicted course guide line L2 regardless of whether or not an object (obstacle) is detected by the obstacle sensor 305, but may change at least one of the vehicle width direction margin and the advancing direction margin and may change a position of at least one of the contour guide line L1 and the predicted course guide line L2 in a case where an object is detected by the obstacle sensor 305. Consequently, an occupant of the vehicle 1 can intuitively recognize that an obstacle is present in a course of the vehicle 1, and thus it is possible to further reduce a probability that the vehicle 1 may collide with the obstacle.

In the present embodiment, the display processing portion 402 may change a display mode of at least one of the contour guide line L1 and the predicted course guide line L2 according to whether or not an object is detected by the obstacle sensor 305. Consequently, an occupant of the vehicle 1 can intuitively recognize that an obstacle is present in a course of the vehicle 1, and thus it is possible to further reduce a probability that the vehicle 1 may collide with the obstacle.

Specifically, in a case where an obstacle is detected by the obstacle sensor 305, the display processing portion 402 causes the contour guide line L1 and the predicted course guide line L2 whose vehicle width direction margin and advancing direction margin has been changed to be displayed in colors (or blinking). On the other hand, in a case where an obstacle is not detected by the obstacle sensor 305, the display processing portion 402 causes the contour guide line L1 and the predicted course guide line L2 whose vehicle width direction margin and advancing direction margin has been changed to be displayed in gray.

As described above, according to the vehicle 1 of the first embodiment, in a case where the vehicle 1 is turned, the contour guide line can be displayed at a position close to a contour of a vehicle image or the predicted course guide line can be displayed at a position close to a course through which the contour of the vehicle image passes in a display image according to movement of the vehicle 1. As a result, in a case where the contour guide line includes a margin, when the vehicle 1 is turned, it is possible to prevent the vehicle 1 from passing through a position excessively separated from an object present therearound.

Second Embodiment

The present embodiment is an example in which, in a case where a stereoscopic image of a vehicle and the periphery thereof is displayed as a display image, a viewpoint of the display image is changed according to a direction in which the vehicle 1 is turned. In the following description, a description of the same configuration as that in the first embodiment will not be repeated.

In the present embodiment, in a case where the vehicle 1 advances straight, the display processing portion 402 generates, as a display image, a stereoscopic image in which a three-dimensional space is viewed from a reference viewpoint located behind the vehicle image and at the center of the vehicle image in a vehicle width direction. The display processing portion 402 causes the generated display image to be displayed on the display portion 8.

Consequently, in a case where the vehicle 1 advances straight, it is possible to display a display image in which a vehicle width of a vehicle image can be easily recognized. As a result, in a case where the vehicle 1 advances straight, it is possible to easily understand a positional relationship with an object present on the sideward of the vehicle 1.

In the present embodiment, in a case where the vehicle 1 is turned, the display processing portion 402 generates, as a display image, a stereoscopic image in which a three-dimensional space is viewed from a predetermined viewpoint that is shifted from the reference viewpoint toward an opposite side to a turning direction of the vehicle 1. The display processing portion 402 causes the generated display image to be displayed on the display portion 8.

Consequently, in a case where the vehicle 1 is turned, it is possible to display a display image in which a location where an occupant is to be careful about contact with an object during turning of the vehicle 1 is seen. As a result, in a case where the vehicle 1 is turned, the vehicle 1 can travel more safely without contact with an object.

Figure 10:
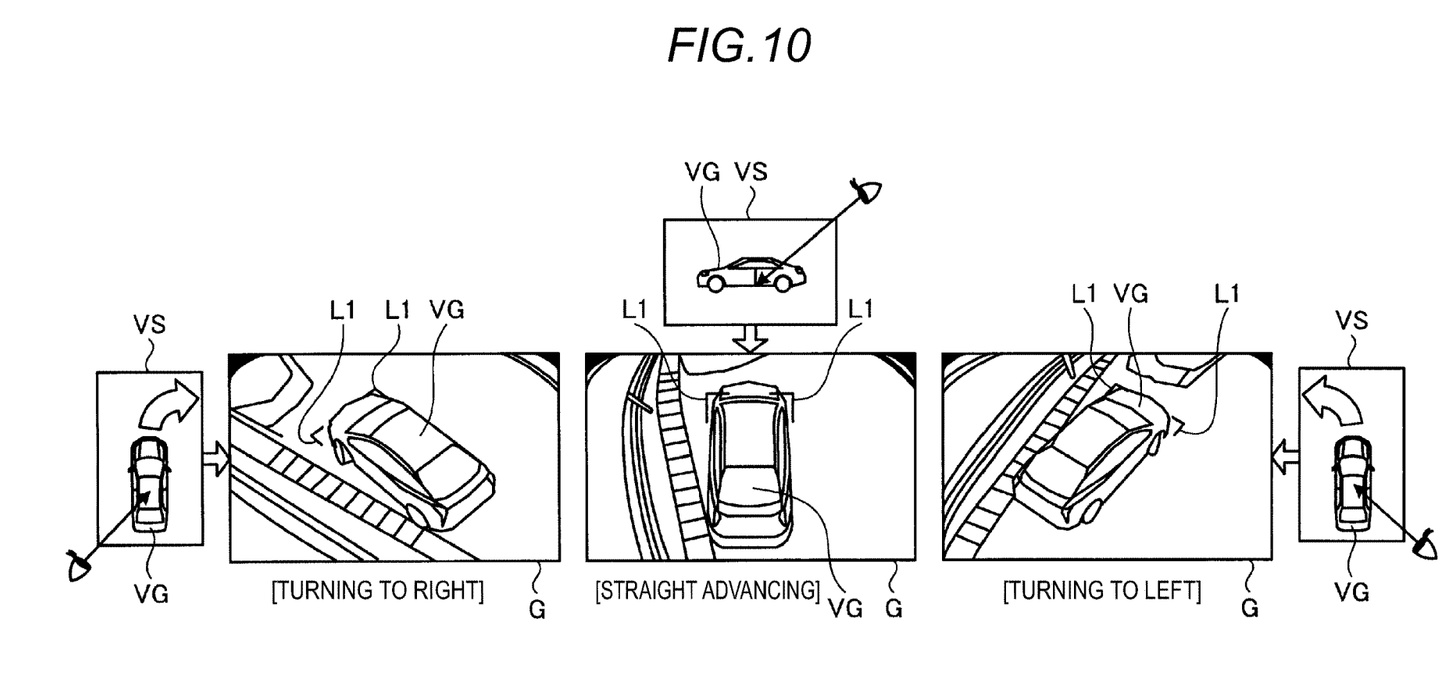
FIG. 10 is a diagram for describing an example of a process in which a display image is displayed by a vehicle periphery display device of a vehicle according to a second embodiment.

FIG. 10 is a diagram for describing an example of a process in which a display image is displayed by a vehicle periphery display device of a vehicle according to a second embodiment.

Next, a description will be made of an example of a process in which a display image is displayed by a vehicle periphery display device 400 with reference to FIG. 10.

In a case where the vehicle 1 advances straight (in a case where a steering angle of the vehicle 1 is 0 degrees), as illustrated in FIG. 10, the display processing portion 402 causes a stereoscopic image in which the three-dimensional space VS is viewed from a predetermined viewpoint that is moved from a reference viewpoint located behind the vehicle image VG and at the center of the vehicle image VG in a vehicle width direction, to be displayed on the display portion 8 as the display image G.

In a case where the vehicle 1 is turned to the right, as illustrated in FIG. 10, the display processing portion 402 causes a stereoscopic image in which the three-dimensional space VS is viewed from a predetermined viewpoint that is moved to a left-shifted target viewpoint from a reference viewpoint located behind the vehicle image VG and at the center of the vehicle image VG in a vehicle width direction, to be displayed on the display portion 8 as the display image G.

In a case where the vehicle 1 is turned to the left, as illustrated in FIG. 10, the display processing portion 402 causes a stereoscopic image in which the three-dimensional space VS is viewed from a predetermined viewpoint that is moved to a right-shifted target viewpoint from a reference viewpoint located behind the vehicle image VG and at the center of the vehicle image VG in a vehicle width direction, to be displayed on the display portion 8 as the display image G.

In the present embodiment, in a case where a steering angle of the vehicle 1 is equal to or more than a predetermined steering angle, the display processing portion 402 causes a stereoscopic image in which the three-dimensional space VS is viewed from a predetermined viewpoint that is moved to a target viewpoint shifted toward an opposite side to a turning direction of the vehicle 1 from a reference viewpoint located behind the vehicle image VG and at the center of the vehicle image VG in a vehicle width direction, to be displayed on the display portion 8 as the display image G.

In this case, the display processing portion 402 may gradually move the predetermined viewpoint toward the target viewpoint. Here, the target viewpoint is a viewpoint of a target that moves the predetermined viewpoint in a case where the vehicle 1 advances straight or the vehicle 1 is turned. When the predetermined viewpoint is gradually moved toward the target viewpoint, the display processing portion 402 may reduce a speed at which the predetermined viewpoint is moved as the predetermined viewpoint comes closer to the target viewpoint.

In the present embodiment, the display processing portion 402 may obtain a target viewpoint according to a steering angle of the vehicle 1 and may cause a stereoscopic image in which the three-dimensional space VS is viewed from a predetermined viewpoint moved to the target viewpoint to be displayed on the display portion 8 as the display image G regardless of whether the steering angle of the vehicle 1 is equal to or more than a predetermined steering angle.

Specifically, the display processing portion 402 obtains a horizontal angle according to the following Equation (1).

$$\text{Horizontal angle} = \text{steering angle of vehicle 1} \times \text{conversion coefficient} \quad (1)$$

Here, the horizontal angle is an angle by which a predetermined viewpoint is shifted in a horizontal direction with respect to an advancing direction of the vehicle 1. The conversion coefficient is a coefficient set in advance.

Next, the display processing portion 402 obtains, as the target viewpoint, a viewpoint shifted in the horizontal direction by the obtained horizontal angle with respect to the advancing direction of the vehicle 1. The display processing portion 402 causes a stereoscopic image in which the three-dimensional space VS is viewed from a predetermined viewpoint that is moved to the target viewpoint, to be displayed on the display portion 8 as the display image G.

For example, in a case where a steering angle of the vehicle 1 becomes −300 degrees and the vehicle 1 is turned to the right, the display processing portion 402 obtains the horizontal angle=−40 degrees by using the above Equation (1). As illustrated in FIG. 10, the display processing portion 402 causes a stereoscopic image in which the three-dimensional space VS is viewed from a predetermined viewpoint that is moved to a target viewpoint shifted by −40 degrees in the horizontal direction with respect to the advancing direction of the vehicle 1 to be displayed on the display portion 8 as the display image G.

For example, in a case where a steering angle of the vehicle 1 is +300 degrees and the vehicle 1 is turned to the left, the display processing portion 402 obtains the horizontal angle=+40 degrees by using the above Equation (1). As illustrated in FIG. 10, the display processing portion 402 causes a stereoscopic image in which the three-dimensional space VS is viewed from a predetermined viewpoint that is moved to a target viewpoint shifted by +40 degrees in the horizontal direction with respect to the advancing direction of the vehicle 1 to be displayed on the display portion 8 as the display image G.

Figure 11:
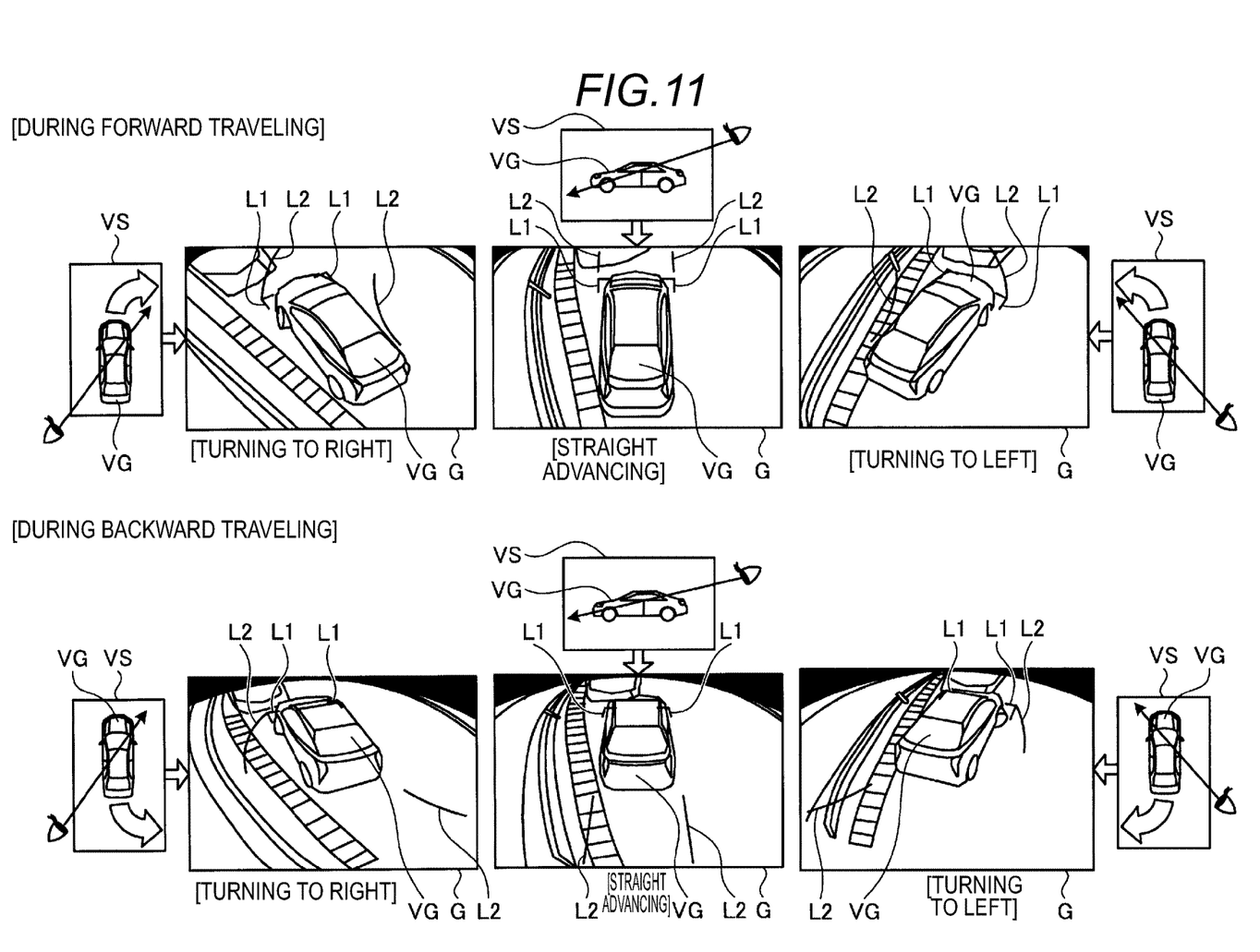
FIG. 11 is a diagram for describing another example of a process in which a display image is displayed by the vehicle periphery display device of the vehicle according to the second embodiment.

FIG. 11 is a diagram for describing another example of a process in which a display image is displayed by the vehicle periphery display device of the vehicle according to the second embodiment.

Next, a description will be made of an example of a process in which the display image G is displayed by the vehicle periphery display device 400 when the vehicle 1 travels forward and backward with reference to FIG. 11.

In a case where the vehicle 1 advances straight, as illustrated in FIG. 11, the display processing portion 402 causes a stereoscopic image in which the three-dimensional space VS is viewed from a predetermined viewpoint that is moved to a reference viewpoint located behind the vehicle image VG and at the center of the vehicle image VG in a vehicle width direction, to be displayed on the display portion 8 as the display image G when the vehicle 1 travels both forward and backward.

Also in a case where the vehicle 1 is turned, as illustrated in FIG. 11, the display processing portion 402 causes a stereoscopic image in which the three-dimensional space VS is viewed from a predetermined viewpoint that is moved to a target viewpoint shifted toward an opposite side to a turning direction of the vehicle 1 from a reference viewpoint located behind the vehicle image VG and at the center of the vehicle image VG in a vehicle width direction when the vehicle 1 travels both forward and backward to be displayed as the display image G.

However, in a case where the vehicle 1 travels backward, as illustrated in FIG. 11, the display processing portion 402 may cause a stereoscopic image in which the three-dimensional space VS is viewed from a predetermined viewpoint further behind the vehicle image VG than in a case where the vehicle 1 advances straight, to be displayed on the display portion 8 as the display image G. Consequently, a rearward visual field of the vehicle image VG in the display image G can be widened. As a result, traveling safety can be improved when the vehicle 1 travels backward.

In the present embodiment, the display processing portion 402 moves a predetermined viewpoint regardless of whether or not an object (obstacle) is detected by the obstacle sensor 305, but may move a predetermined viewpoint only in a case where an object is detected by the obstacle sensor 305. Consequently, it is possible to easily understand whether or not there is an obstacle around the vehicle 1 depending on whether or not a predetermined viewpoint has been moved.

As described above, according to the vehicle 1 of the second embodiment, in a case where the vehicle 1 is turned, it is possible to display a display image in which a location where an occupant is to be careful about contact with an object during turning of the vehicle 1 is seen. As a result, in a case where the vehicle 1 is turned, the vehicle 1 can travel more safely without contact with an object.

Modification Example

The present modification example is an example in which a contour guide line having a vehicle width direction margin based on a width of an electronic mirror of a vehicle image is displayed in a display image. In the following description, description of the same configurations as those of the above-described embodiment will not be repeated.

Figure 12:
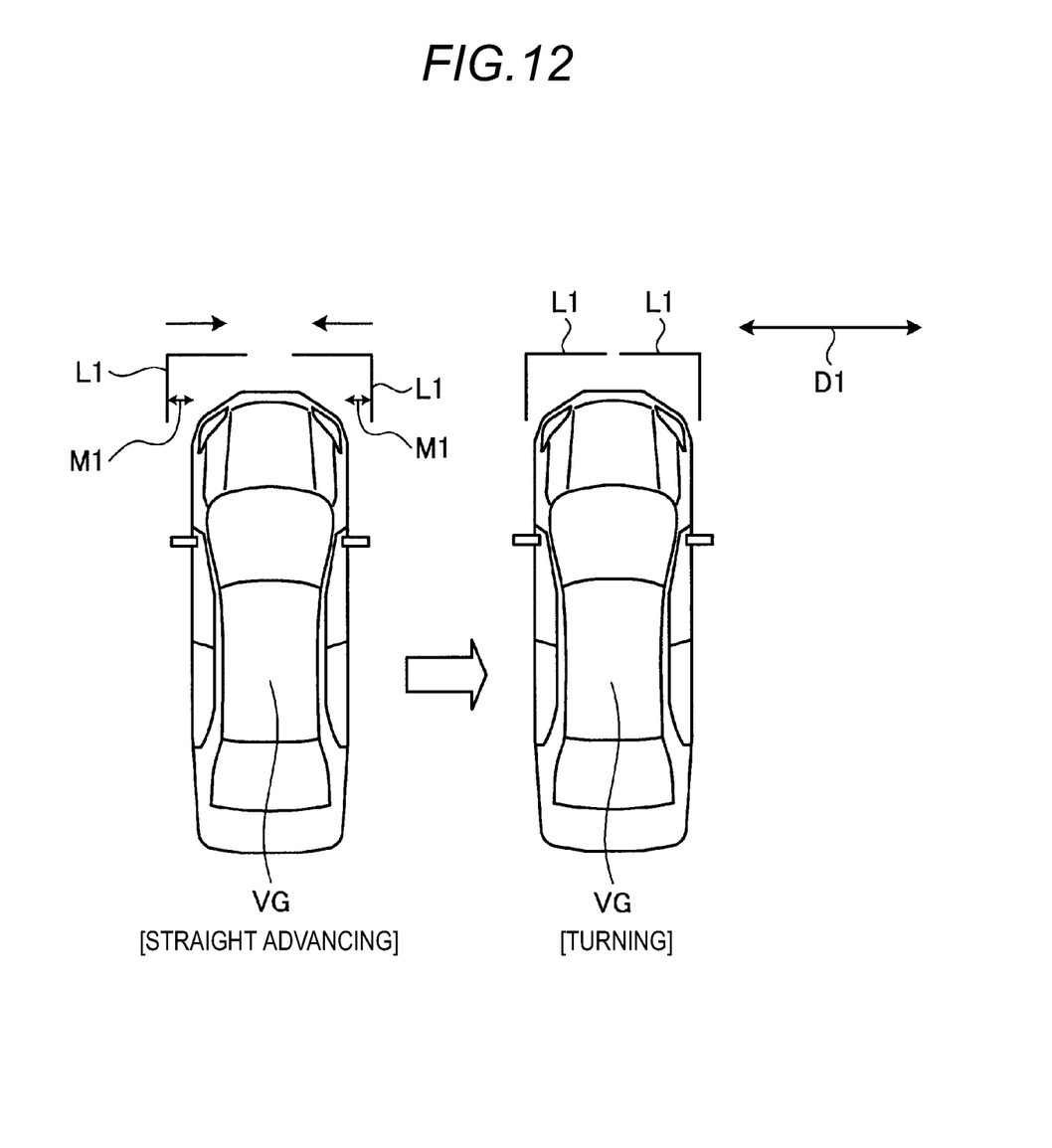
FIG. 12 is a diagram for describing an example of a process in which a margin of a contour guide line is changed by a vehicle periphery display device of a vehicle according to a modification example.

FIG. 12 is a diagram for describing an example of a process in which a margin of a contour guide line is changed by a vehicle periphery display device of a vehicle according to the modification example.

With reference to FIG. 12, a description will be made an example of a process in which a margin of the contour guide line L1 is changed by the vehicle periphery display device 400 according to the present modification example.

In a case where the vehicle 1 advances straight, as illustrated in FIG. 12, the display processing portion 402 causes the contour guide line L1 having the vehicle width direction margin M1 in the vehicle width direction D1 of the vehicle image VG based on a width of an electronic mirror of the vehicle image VG (for example, the vehicle width direction margin M1 equal to or more than the width of the electronic mirror of the vehicle image VG) to be included in a display image. On the other hand, in a case where the vehicle 1 is turned, the display processing portion 402 reduces the vehicle width direction margin M1 by the width of the electronic mirror of the vehicle image VG, as illustrated in FIG. 12.

Consequently, when the vehicle 1 is turned, the contour guide line L1 can be displayed at a position close to the contour of the vehicle image VG or the predicted course guide line L2 can be displayed at a position close to a course through which the contour of the vehicle image VG passes according to movement of the vehicle 1 in the display image. As a result, in a case where the contour guide line L1 includes the vehicle width direction margin M1, when the vehicle 1 is turned, it is possible to prevent the vehicle 1 from passing through a position excessively separated from an object present therearound.

A vehicle periphery display device according to an embodiment includes, as an example, an acquisition portion that acquires a captured image obtained by imaging a periphery of a vehicle with an imaging portion; and a display processing portion that causes a display image including a vehicle image of the vehicle and a periphery image of the vehicle to be displayed on a display portion on the basis of the captured image acquired by the acquisition portion, in which the display processing portion causes at least one of a contour guide line representing a contour of the vehicle image and having a first margin in a vehicle width direction of the vehicle image and a second margin in an advancing direction of the vehicle image, and a predicted course guide line that is a trajectory drawn by the contour guide line according to movement of the vehicle to be displayed in the display image, and changes at least one of the first margin and the second margin in a case where the vehicle is turned. Therefore, as an example, in a case where the vehicle is turned, it is possible to prevent the vehicle from passing through a position excessively separated from an object present therearound.

In the vehicle periphery display device according to the embodiment, as an example, the display processing portion may reduce at least one of the first margin and the second margin in a case where the vehicle is turned, compared with a case where the vehicle advances straight. Therefore, as an example, in a case where the vehicle is turned, it is possible to prevent the vehicle from passing through a position excessively separated from an object present therearound.

In the vehicle periphery display device according to the embodiment, as an example, the display processing portion may cause the contour guide line having the first margin based on a width of a side-view mirror of the vehicle image to be displayed in a case where the vehicle advances straight, and reduces the first margin by the width of the side-view mirror in a case where the vehicle is turned. Therefore, as an example, in a case where the contour guide line has the first margin, when the vehicle is turned, it is possible to prevent the vehicle from passing through a position excessively separated from an object present therearound.

In the vehicle periphery display device according to the embodiment, as an example, the display processing portion may cause the contour guide line having the first margin based on a width of an electronic mirror of the vehicle image to be displayed in a case where the vehicle advances straight, and reduces the first margin by the width of the electronic mirror in a case where the vehicle is turned. Therefore, as an example, in a case where the contour guide line has the first margin, when the vehicle is turned, it is possible to prevent the vehicle from passing through a position excessively separated from an object present therearound.

In the vehicle periphery display device according to the embodiment, as an example, the display processing portion may cause the contour guide line having the second margin based on a predetermined margin in the advancing direction to be displayed in a case where the vehicle advances straight, and reduces the second margin by the predetermined margin in a case where the vehicle is turned. Therefore, as an example, in a case where the contour guide line has the second margin, when the vehicle is turned, it is possible to prevent the vehicle from passing through a position excessively separated from an object present therearound.

In the vehicle periphery display device according to the embodiment, as an example, in a case where the vehicle is turned, the display processing portion may gradually reduce at least one of the first margin and the second margin with the passage of time. Therefore, as an example, when the vehicle is turned, it is possible to prevent an occupant of the vehicle from feeling uncomfortable due to the first margin and the second margin abruptly becoming smaller.

In the vehicle periphery display device according to the embodiment, as an example, in a case where the vehicle is turned, the display processing portion may leave, in the display image, at least one of the contour guide line and the predicted course guide line whose at least one of the first margin and the second margin has not been changed. Therefore, as an example, the vehicle can pass through an obstacle more safely.

In the vehicle periphery display device according to the embodiment, as an example, the display processing portion may make a display mode of at least one of the contour guide line and the predicted course guide line whose at least one of the first margin and the second margin has not been changed different from a display mode of at least one of the contour guide line and the predicted course guide line whose at least one of the first margin and the second margin has been changed. Therefore, as an example, it is possible to further reduce a probability that an occupant who sees the display image may misunderstand a distance from the vehicle to an obstacle and thus the vehicle may collide with the obstacle.

In the vehicle periphery display device according to the embodiment, as an example, in a case where the vehicle is turned, the display processing portion may cause a stereoscopic image in which a three-dimensional space including the vehicle image and the periphery image is viewed from a predetermined viewpoint that is shifted toward an opposite side to a turning direction of the vehicle from a reference viewpoint located behind the vehicle image and at a center of the vehicle image in the vehicle width direction, to be displayed on the display portion as the display image. Therefore, as an example, in a case where the vehicle is turned, the vehicle can travel more safely without contact with an object.

In the vehicle periphery display device according to the embodiment, as an example, in a case where an object present around the vehicle is detected by an obstacle sensor, the display processing portion may change at least one of the first margin and the second margin. Therefore, as an example, it is possible to further reduce a probability that the vehicle may collide with an obstacle.

In the vehicle periphery display device according to the embodiment, as an example, in a case where an object present around the vehicle is detected by an obstacle sensor, the display processing portion may move the predetermined viewpoint. Therefore, as an example, it is possible to easily understand whether or not there is an obstacle around the vehicle depending on whether or not the predetermined viewpoint has been moved.

In the vehicle periphery display device according to the embodiment, as an example, the display processing portion may change a display mode of at least one of the contour guide line and the predicted course guide line according to whether or not an object present around the vehicle is detected by an obstacle sensor. Therefore, as an example, it is possible to further reduce a probability that the vehicle may collide with an obstacle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle periphery display device comprising:
at least one hardware processor configured to implement:
an acquisition portion that acquires a captured image obtained by imaging a periphery of a vehicle with an imaging portion; and
a display processing portion that causes a display image including a vehicle image of the vehicle and a periphery image of the vehicle to be displayed on a display portion on the basis of the captured image acquired by the acquisition portion, wherein
the display processing portion causes at least one of a contour guide line representing a contour of the vehicle image and having a first margin in a vehicle width direction of the vehicle image and a second margin in an advancing direction of the vehicle image, and a predicted course guide line that is a trajectory drawn by the contour guide line according to movement of the vehicle to be displayed in the display image, and changes at least one of the first margin and the second margin in a case where the vehicle is turned,
the display processing portion reduces at least one of the first margin and the second margin in a case where the vehicle is turned; compared with a case where the vehicle advances straight, the display processing portion causes the contour guide line having the first margin based on a width of a side-view mirror or an electronic mirror of the vehicle image to be displayed in a case where the vehicle advances straight, and reduces the first margin by the width of the side-view mirror or the electronic mirror in a case where the vehicle is turned.

2. The vehicle periphery display device according to claim 1, wherein
the display processing portion causes the contour guide line having the second margin based on a predetermined margin in the advancing direction to be displayed in a case where the vehicle advances straight, and reduces the second margin by the predetermined margin in a case where the vehicle is turned.

3. The vehicle periphery display device according to claim 1, wherein,
in a case where the vehicle is turned, the display processing portion gradually reduces at least one of the first margin and the second margin with the passage of time.

4. The vehicle periphery display device according to claim 1, wherein,
in a case where an object present around the vehicle is detected by an obstacle sensor, the display processing portion changes at least one of the first margin and the second margin.

5. The vehicle periphery display device according to claim 1, wherein
the display processing portion changes a display mode of at least one of the contour guide line and the predicted course guide line according to whether or not an object present around the vehicle is detected by an obstacle sensor.

6. A vehicle periphery display device comprising:
at least one hardware processor configured to implement:
an acquisition portion that acquires a captured image obtained by imaging a periphery of a vehicle with an imaging portion; and
a display processing portion that causes a display image including a vehicle image of the vehicle and a periphery image of the vehicle to be displayed on a display portion on the basis of the captured image acquired by the acquisition portion, wherein
the display processing portion causes at least one of a contour guide line representing a contour of the vehicle image and having a first margin in a vehicle width direction of the vehicle image and a second margin in an advancing direction of the vehicle image, and a predicted course guide line that is a trajectory drawn by the contour guide line according to movement of the vehicle to be displayed in the display image, and changes at least one of the first margin and the second margin in a case where the vehicle is turned, wherein,
in a case where the vehicle is turned, the display processing portion leaves, in the display image, at least one of the contour guide line and the predicted course guide line whose at least one of the first margin and the second margin has not been changed, and
the display processing portion makes a display mode of at least one of the contour guide line and the predicted course guide line whose at least one of the first margin and the second margin has not been changed different from a display mode of at least one of the contour guide line and the predicted course guide line whose at least one of the first margin and the second margin has been changed.

7. A vehicle periphery display device comprising:
at least one hardware processor configured to implement:
an acquisition portion that acquires a captured image obtained by imaging a periphery of a vehicle with an imaging portion; and
a display processing portion that causes a display image including a vehicle image of the vehicle and a periphery image of the vehicle to be displayed on a display portion on the basis of the captured image acquired by the acquisition portion, wherein
the display processing portion causes at least one of a contour guide line representing a contour of the vehicle image and having a first margin in a vehicle width direction of the vehicle image and a second margin in an advancing direction of the vehicle image, and a predicted course guide line that is a trajectory drawn by the contour guide line according to movement of the vehicle to be displayed in the display image, and changes at least one of the first margin and the second margin in a case where the vehicle is turned, wherein,
in a case where the vehicle is turned, the display processing portion causes a stereoscopic image in which a three-dimensional space including the vehicle image and the periphery image is viewed from a predetermined viewpoint that is shifted toward an opposite side to a turning direction of the vehicle from a reference viewpoint located behind the vehicle image and at a center of the vehicle image in the vehicle width direction, to be displayed on the display portion as the display image.

8. The vehicle periphery display device according to claim 7, wherein,
in a case where an object present around the vehicle is detected by an obstacle sensor, the display processing portion moves the predetermined viewpoint.

* * * * *